United States Patent

[11] 3,604,327

| [72] | Inventor | Hiroshi Hirata<br>Sakai, Japan |
|---|---|---|
| [21] | Appl. No. | 832,236 |
| [22] | Filed | June 11, 1969 |
| [45] | Patented | Sept. 14, 1971 |
| [73] | Assignee | Minolta Camera Kabushiki<br>Kaisha, Osaka, Japan |
| [32] | Priority | June 18, 1968 |
| [33] | | Japan |
| [31] | | 43/42030 |

[54] CAMERA LIGHT SENSING SYSTEM
11 Claims, 3 Drawing Figs.

[52] U.S. Cl. .................................................. 95/10 C,
95/31 FS, 95/64 R, 352/78, 352/141
[51] Int. Cl. ........................................................G03b 19/04,
G03b 19/18
[50] Field of Search............................................. 95/10 C,
64, 64 D, 31, 31 FS; 352/72, 78, 141

[56] References Cited
UNITED STATES PATENTS

| 3,266,398 | 8/1966 | Kremp et al. ................. | 95/10 C X |
| 3,312,158 | 4/1967 | MacMillin et al. ............. | 95/10 C |
| 3,362,774 | 1/1968 | Easterly ........................ | 352/72 |
| 3,386,357 | 6/1968 | Kremp et al. .................. | 95/10 C |
| 3,410,186 | 1/1968 | Kaneko ......................... | 352/72 X |
| 3,461,782 | 8/1969 | Katsuyama .................... | 95/10 C |

Primary Examiner—Joseph F. Peters
Attorney—Stanley Wolder

ABSTRACT: A mechanism for automatically adjusting the sensitivity of a camera light measuring system in accordance with the sensitivity of film in a magazine which is provided with a front sensitivity index defining shoulder includes, a variable light attenuator positioned ahead of a photocell, and a magazine compartment with a front wall. A sensing finger projects through the front wall and is spring urged to advance into engagement with the index and controls the light attenuator. A spring loaded return member urges the finger to a retracted position and includes a plunger projecting into the magazine compartment to be pushed by the inserted magazine to advance the return member and actuate the sensing and control operation and thereby adjust the light attenuator in accordance with the film sensitivity.

INVENTOR
HIROSHI HIRATA

BY *Stanley Wolder*

ATTORNEY

CAMERA LIGHT SENSING SYSTEM

BACKGROUND OF THE INVENTION

The present invention relates generally to improvements in camera light sensing systems and it relates particularly to an improved mechanism for automatically adjusting the sensitivity of a camera light measuring system in response to a film sensitivity index member carried by a replaceable magazine wherein direct visual confirmation is provided of the correct positioning of the magazine and the accurate operation of the sensitivity control mechanism.

In the conventional film sensitivity setting mechanism in a camera used with a film magazine of the film sensitivity indexed type the adjustment for the film sensitivity is automatically performed by closing the lid member of the film chamber for shutting the film chamber after loading a film magazine therein, or by the movement of a resilient member mounted on the lid member, which resilient member urges the film magazine to is correct operating position after the lid member has closed the film chamber, or by the movement of a locking member which locks the lid member after closing the film chamber for preventing the lid member from opening. Such conventional film sensitivity setting mechanisms possess the disadvantage that the film setting is completed when the lid member closes the film chamber, or the lid member is locked, so that a separate indicating means is necessary to determine whether or not the film magazine is located at the correct operating position and the film sensitivity setting mechanism is correctly operated.

SUMMARY OF THE INVENTION

It is a principal object of the present invention to provide an improved camera automatic light responsive control mechanism.

Another object of the present invention is to provide an improved mechanism for automatically adjusting the sensitivity of a camera light measuring system in accordance with the sensitivity or speed rating of a film in a replacable film magazine.

Still another object of the present invention is to provide a camera light measuring system which is automatically adjusted in response to an index element carried by a replacable film magazine.

A further object of the present invention is to provide in a camera a film magazine carried index controlled light measuring system which provides a direct visual indication of the proper positioning of the magazine and the operation of the control mechanism.

The above and other objects of the present invention will become apparent from a reading of the following description taken in conjunction with the accompanying drawings which illustrate a preferred embodiment thereof.

In a sense the present invention contemplates the provision of a camera employing a replacable film magazine provided with index defining means positioned on the magazine in accordance with the sensitivity of the film therein comprising means for sensing the position of said index including an index sensing element movable between a retracted position and an index sensing advanced position, activating means responsive to the insertion of said magazine into said camera for effecting the advance of said sensing element toward said index, and light measuring means controlled in response to the position of said sensing element.

According to a preferred form of the improved camera, the light measuring means includes a photocell and a variable light attenuator located ahead of the photocell. The camera includes a magazine compartment with a front partition wall and lid defining hinged sidewall. The sensing mechanism includes a slideably mounted plate supporting a sensing finger projecting through a slot in the partition wall and spring urged to an advanced position. A swingable arm engages the slide plate and is spring loaded to urge the slide plate to its retracted position. A plunger is coupled to the swingable arm and projects into the magazine compartment so that upon insertion of a magazine it is pushed inwardly to swing the arm so as to permit the advance of the slide member which advances the sensing finger into engagement with an index shoulder located on the magazine front face. The advance of the slide plate adjusts the light attenuator in accordance with the film sensitivity as indicated by the index shoulder.

The registry of the sensing finger with the index section of the film magazine and the proper index sensing movement thereof is clearly visible during the insertion of the magazine thereby obviating the need for additional indicating means, and any likelihood of improper magazine insertion and inaccurate light measuring procedure due to improper adjustment of the light measuring system for different film sensitivities.

DESCRIPTION OF THE PREFERRED EMBODIMENT

Figure 1:
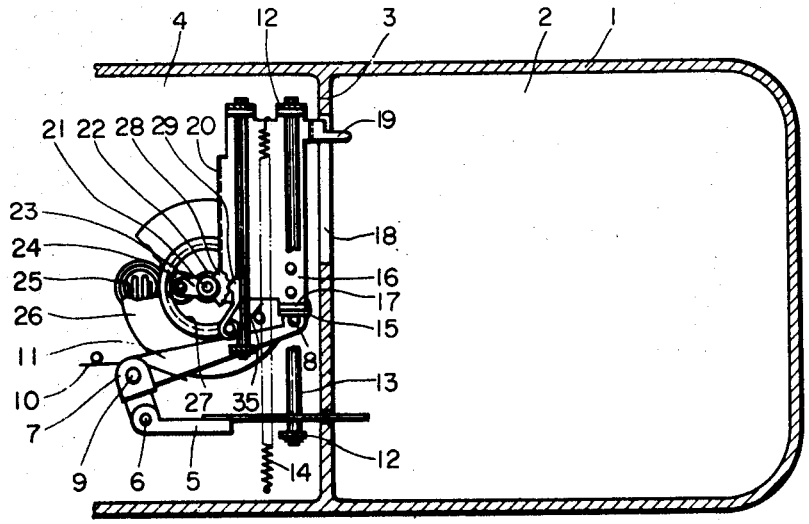
FIG. 1 is a fragmented longitudinal sectional view of part of a camera embodying the present invention.

Referring now to the drawing which illustrates a preferred embodiment of the present invention, the reference numeral 1 generally designates the body of the improved camera which includes a mechanism housing chamber or compartment 4 and a film magazine chamber or compartment 3 separated from chamber 4 by an intervening partition wall 3. A plate or plunger 5 for actuating the film sensitivity control mechanism has one end extending into the film chamber 2, and is pivotally connected at its other end to one arm of a rocking lever or bell crank 7 by a pin 6 so as to be horizontally movable. The bell crank 7 is pivoted at its elbow to a fixed shaft 9 and includes an operating lever 11 carrying a pin or abutment 8 secured at the free end thereof. A spring 10 acts to bias the rocking lever or bell crank 7, and accordingly the operating lever 11, in a counterclockwise direction. The operating lever 11 transmits the movement of the operating plate 5 to a sensing plate 16.

Guide rods 13 are secured to a pair of support members or brackets 12 projecting from a suitable base plate (not shown). The sensing plate 16, which is biased downwards by a spring 14, has bent portions 17, each having a hole (not shown) cooperating with the guide rods 13 in a slidable manner, so that the sensing plate 16 is restricted to vertical movement by the guide rods 13. In the illustrated embodiment, two guide rods 13 are shown, but the invention is not restricted to two rods, but one rod, or three or more rods, can be used to guide the movement of the sensing plate. The sensing plate 16 also has a contact or abutment plate 15 integrally formed therewith in such manner that the pin 8 at the free end of the rocking lever 7 is engageable with the contact plate 15 of the sensing plate 16 when the rocking lever 7 rotates counterclockwise, as seen in FIG. 1. A sensing finger 19 integrally formed with the sensing plate 16 extends into the film chamber 2 through a slot 18 formed in the partition wall 3, so that the sensing finger 19 cooperates with a film magazine 32 (FIG. 2) inserted in the film chamber 2. A rack 20 is secured to the sensing plate 16 in such manner that the rack 20 meshes with a spur gear 22 pivoted to a shaft 21. The spur gear 22, in turn, meshes with a planet gear 24, which is pivoted at an end of an arm 23 fixed to the shaft 21. The planet gear 24 operatively meshes with a ring gear 27, which is secured to a light value control member or variable light attenuating member 26 rotatable about the axis of the shaft 21 and functioning as a sensitivity adjustment. A photoelectric element 25, such as a cadmium sulfide cell, or other photocell is mounted behind a light value control member 26, and is exposed to the light traversing control member 26. A click plate 28 formed in the shape of a sector gear is secured to the shaft 21 and biased counterclockwise by a spring 35. A click lever 29 engages the click plate 28, so as to determine the angular position of the shaft 21. In the described embodiment, the light value control member 26 defines the film sensitivity adjustment device and it is preferably formed with a wedge-shaped filter, or a throttle plate employing various perforations or plate edges, or any other suitable variable light attenuator.

The aforesaid planetary gear mechanism for connecting the rack 20 to the ring gear 27 and the click mechanism for positioning the planetary gear mechanism are not essential to the present invention, and they will not be described in detail here.

Figure 2:
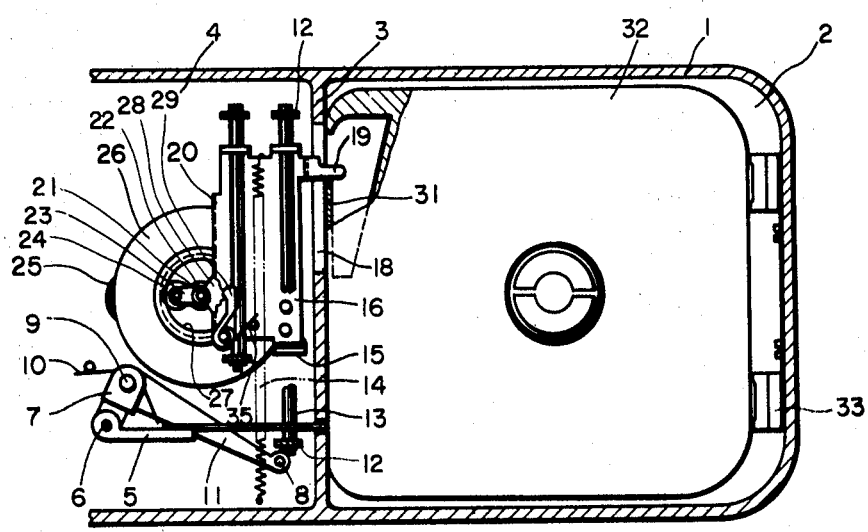
FIG. 2 is a view similar to FIG. 1 illustrating the light measuring system automatically adjusted by an inserted film magazine.

Referring to FIG. 2, which is similar to FIG. 1 except that the film magazine 32 is shown inserted in the film chamber 2 and that the adjustment setting is effected for the film sensitivity, the film magazine 32 is held in position by magazine holding springs 33 secured to the camera body 1. The operating plate 5 extending into the film chamber 2 is depressed by the front surface of the film magazine 32, so as to move to the left, as seen in FIG. 2. In the position shown FIG. 1, the pin 8 secured to the free end of the operating lever 11 holds the sensing plate 16 in its raised or ready position under the influence of the spring 10 against the urging of the spring 14, but in the position of FIG. 2, the pin 8 is lowered in response to the clockwise rotation of the rocking lever or bellcrank 7 caused by the leftward movement of the operating plate or plunger 5. As a result, the pin 8 disengages the contact plate 15 of the sensing plate 16, so that the sensing plate 16 is pulled down by the spring 14, until the sensing finger 19 engages the shoulder of an indicating notch or index element 31 of the inserted film magazine 32. The position of the shoulder of the indicating notch or index 31 relative to the body of the film magazine 32 is predetermined depending on the sensitivity of the film loaded in the magazine 32. Thus, the sensing plate 16 is brought to a position corresponding to the sensitivity of the film loaded in the camera.

Figure 3:
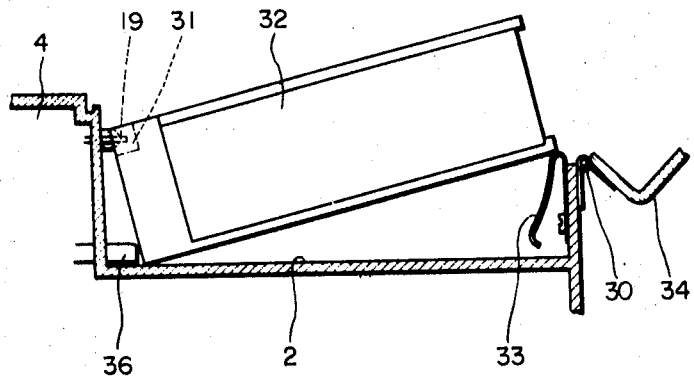
FIG. 3 is a fragmentary transverse sectional view thereof illustrating the insertion of a film magazine.

FIGS. 1 and 2 are views taken from a direction of a film winding shaft (not shown) and show the camera body in the state as opened with a hinged side lid 34 turned open, as can best be seen in FIG. 3. Accordingly, with the side lid 34 held open, a photographer can directly visually observe and confirm whether the sensing finger 19 in contact with the film sensitivity indicating notch 31 is correctly positioned.

The aforesaid downward movement of the sensing plate 16 is transmitted to the light value control member or attenuator 26 through the rack 20, the spur gear 22, the planet gear 24, and the ring gear 27. Thereby, the angular position of the light value control member 26 is determined in accordance with the position reached by the sensing plate 16. The construction of the light value control member 26 is such that the intensity of radiation incident on the photoelectric element 25, such as a cadmium sulfide photocell, varies depending on the angular position of the light value control member 26. Accordingly, when the angular position of the light value control member 26 is determined, the camera is set for the sensitivity of the film loaded in the camera.

As seen in FIG. 3, which illustrates the film magazine 32 in the process of being inserted in the film chamber 2 of the camera body 1, the side lid 34 rotatably mounted on a hinge 30 is kept open. The sensing finger 19 is inserted into the sensitivity indicating notch faced by the index 31 and formed at the front surface of the film magazine 32 before the front surface of the film magazine 32 is forced to come in contact with the tip 36 of the operating plate or plunger 5 by the action of the springs 33. With such construction, it is possible to prevent any malfunctions, such as depression of the operating plate 5 by the film magazine 32 prior to the insertion of the sensing finger 19 in the indicating notch of the film magazine 32, which leads to the failure of engagement of the sensing finger 19 with the shoulder of index 31. After being inserted in the film chamber 2 against the elasticity of the spring 33, the film magazine 32 is held in position by indexing pins (not shown)

and the springs 33. Since the side lid 34 can be kept open when the film magazine 32 is inserted in the film chamber 2, the photographer can confirm by direct observation that the film magazine is correctly positioned and the sensing finger 19 is correctly engaged with the film sensitivity index element 31 of the film magazine.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

1. A camera employing a replacable film magazine provided with index defining means positioned on the magazine in accordance with the sensitivity of the film therein comprising means for sensing the position of said index including an index sensing element movable between a retracted position and an index sensing advanced position, retracting spring means resiliently urging said sensing element toward said retracted position activating means responsive to the insertion of said magazine into said camera for resiliently effecting the advance of said sensing element toward said index, and light measuring means controlled in response to the position of said sensing element.

2. The camera of claim 1 wherein said light measuring means comprises a photosensitive element and an adjustable light attenuator located in the path of light incident on said photosensitive element and responsive to the position of said sensing element.

3. The camera of claim 2 wherein said sensing means includes a slide member supporting said sensing element and movable therewith between retracted and advanced positions, said activating means includes first spring means normally urging said slide member toward its advanced position and a return member engaging said slide member and movable therewith between retracted and advanced positions, and said retracting spring means includes a spring urging said return member toward its retracted position whereby to urge said slide member toward its retracted position and an actuating member connected to said return member and motivated by the insertion of said magazine in said camera to urge said return member to its advanced position.

4. A camera provided with a magazine compartment having a front partition wall with a longitudinal slot formed therein and employing a replacable film magazine including a front face confronting said front wall when in camera loaded condition and having a recess provided with an index defining shoulder positioned on said magazine in accordance with the sensitivity of the film therein comprising means disposed forwardly of said partition wall for sensing the position of said index and including a sensing element comprising a finger projecting through said slot into registry with said magazine recess and being slideable along said slot between a retracted position and an index sensing advanced position, activating means responsive to the insertion of said magazine into said camera for effecting the advance of said sensing element toward said index and including a resiliently rearwardly urged plunger member projecting through said partition wall into said magazine compartment, and light measuring means controlled in response to the position of said sensing element.

5. The camera of claim 4 wherein said sensing element and said plunger are longitudinally and transversely spaced.

6. The camera of claim 4 wherein said magazine compartment includes a side opening for insertion of said magazine, a lid releasably closing said side opening, and a sidewall opposite said side opening, said plunger being positioned proximate said wall and said sensing element being disposed proximate said side opening.

7. A device for automatically setting film sensitivity in a camera, comprising an operating plate spring urged to a raised position and being depressible by a film magazine as the film magazine is inserted in the body of the camera; a sensing plate having a sensing finger spring urged to a depressed position and being normally raised with said operating plate, said sensing plate being released from said raised position in response to said depression of said operating plate; a film sensitivity indicating means integrally formed in said film magazine, said sensing finger moving until coming into engagement with said film sensitivity indicating means in response to said release of said sensing plate; and a light value control member being movable by said sensing plate upon said release of said locking, so as to control incident intensity of radiation to a photoelectric element.

8. A device for automatically setting film sensitivity in a camera, comprising an operating plate being depressible by a film magazine as the film magazine is inserted in the body of the camera; a sensing plate having a sensing finger and being normally locked, said sensing plate being released from said locking in response to said depression of said operating plate; a film sensitivity indicating means integrally formed in said film magazine, said sensing finger moving until coming into engagement with said film sensitivity indicating means in response to said release of said sensing plate; a light value control member being movable by said sensing plate upon said release of said locking, so as to control incident intensity of radiation to a photoelectric element; a rocking lever and a spring biasing said rocking lever, said rocking lever being pivotally connected to said operating plate at one end thereof and being normally engaged with said sensing plate, at the opposite end thereof by the force of said spring, wherein the biasing force of said sensing plate is smaller than that of said rocking lever.

9. A device for automatically setting film sensitivity in a camera as set forth in claim 8, wherein said film sensitivity indicating means is an indicating notch being adjustable in accordance with the sensitivity of the film loaded in said film magazine, and said sensing finger moves along a slot formed in a partition wall of the camera body until coming into engagement with said indicating notch of said film magazine.

10. A device for automatically setting film sensitivity in a camera as set forth in claim 9, wherein said sensing finger enters into said indicating notch of said film magazine before the tip of said operating plate is depressed by the front surface of said film magazine.

11. A device for automatically setting film sensitivity in a camera as set forth in claim 8, wherein said light value control member for controlling the incident intensity of radiation is formed by a variable light attenuating member.